Sept. 2, 1969 W. E. SURKO, JR 3,464,721
TUBE COUPLING

Filed Nov. 2, 1967 2 Sheets-Sheet 1

INVENTOR
WALTER E. SURKO, JR.

BY *Lowry & Rinehart*

ATTORNEYS

Sept. 2, 1969     W. E. SURKO, JR     3,464,721

TUBE COUPLING

Filed Nov. 2, 1967     2 Sheets-Sheet 2

INVENTOR
WALTER E. SURKO, JR.

BY *Lowry and Rinehart*

ATTORNEYS

United States Patent Office 3,464,721
Patented Sept. 2, 1969

3,464,721
TUBE COUPLING
Walter E. Surko, Jr., Kensington, Conn., assignor to Emhart Corporation, Bloomfield, Conn., a corporation of Connecticut
Filed Nov. 2, 1967, Ser. No. 680,150
Int. Cl. F16l 55/00, 31/00, 21/00
U.S. Cl. 285—174
3 Claims

ABSTRACT OF THE DISCLOSURE

A tube coupling which includes a corrugated tube section and a noncorrugated tube section joined by a resilient seal-connector wherein no adhesives or other sealing compounds are required to make a tight connection. The seal connector includes an undulating rib and groove portion which is adaptable to said corrugated tubing and a smooth portion which is adaptable to said conventional tubing.

BACKGROUND OF THE INVENTION

This invention relates to a tube coupling, and more particularly to a sealing connector for providing a fluid-tight joint between corrugated and noncorrugated sections of tubing.

Many of the problems heretofore encountered in the coupling art were solved when an inexpensive, thin-walled, flexible plastic tubing having a corrugated or undulating rib and groove configuration was recently introduced into the market. Because of its accordion-like construction, such tubing can easily be bent to almost any desired angle without collapsing or otherwise causing a loss of flow capacity, and it is therefore particularly useful for joining two angularly related pipe members such as are found in washing machines, dishwashers and other appliances.

One major drawback to the use of such flexible corrugated plastic tubing was the problem of attaching it to a noncorrugated pipe section. Although the new tubing is extremely flexible in a lengthwise direction, it cannot be readily compressed in a radial direction. Hence, any attempt to clamp it to a regularly shaped noncorrugated section of tubing or pipe with conventional hose clamps did not meet with success. Moreover, the corrugated configuration of the tubing made it extremely difficult to prevent leakage at the joint between the corrugated tubing and noncorrugated sections of tubing. The result of the foregoing problems is that the usage of the plastic tubing has been limited and the producers thereof have been unable to exploit fully its numerous advantages.

SUMMARY OF THE INVENTION

The foregoing problems have been obviated by providing an inexpensive connector which not only makes it possible to easily join corrugated tubing to conventional, noncorrugated tubing or pipe, but which also functions as a seal to prevent any liquid from escaping at the juncture of sections of the said tubing. A seal-connector has been provided which can be easily used by those having even a minimum of skill in the plumbing or coupling art for joining sections of tubing. In addition, the seal-connector requires no adhesives or other sealing compounds to make a tight connection.

It is therefore an object of the present invention to provide a coupling means to effectively join together corrugated tubing and conventional smooth walled tubing.

It is another object of the present invention to provide a resilient seal-connector of a desired material and having a sufficient amount of resilience to provide adequate gripping forces to couple and seal corrugated tubing to noncorrugated tubing.

It is still another object of the invention to provide a seal-connector having a portion which conforms to the undulating rib and groove configuration of a corrugated tube section and a portion which conforms to the smooth surface of a noncorrugated tube section.

An additional object of the present invention is to provide a seal-connector for joining corrugated and noncorrugated tube sections wherein the said corrugated tube section is flexible.

Another object of the present invention is to provide a seal-connector having an undulating rib and groove portion for contacting a corrugated tube section and a smooth portion for contacting a noncorrugated tube section wherein said sealing conection is designed to expand into tight sealing engagement with the corrugated tube section upon final positioning of a noncorrugated tube section in contact with said smooth portion.

It is still a further object of the present invention o provide a seal-connector which has a central bore therethrough for accepting a noncorugated tube section and is designed to expand into tight sealing engagement with the corrugated section upon insertion of a noncorrugated tube section into said bore.

DESCRIPTION OF THE DRAWINGS

These and other objects and features of the invention will be more readily understood and appreciated from the following detailed description of a specific embodiment and a modification thereof, both of which are shown in the accompanying drawings in which.

DESCRIPTION OF THE SPECIFIC EMBODIMENT

More specifically, the drawings show a coupling generally designated 10 including a length of flexible corrugated plastic tubing 11, a section of conventional, rigid, noncorrugated tubing 12 and a seal-connector 13 of the present invention. The flexible plastic tubing 11 is molded of a pliable plastic material. The corrugations or accordion-like undulations allow it to be bent into almost any angle or configuration. The tubing is manufactured in long lengths which are coiled to permit easy handling and may readily be cut into any desired length.

Figure 1:
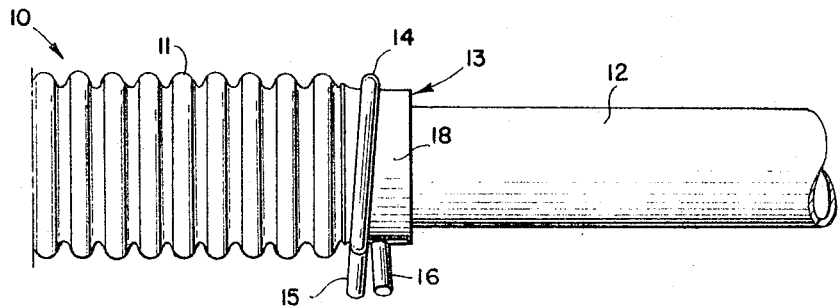
FIGURE 1 is a side elevational view of a tube coupling including a seal-connector of the present invention.
Figure 3:
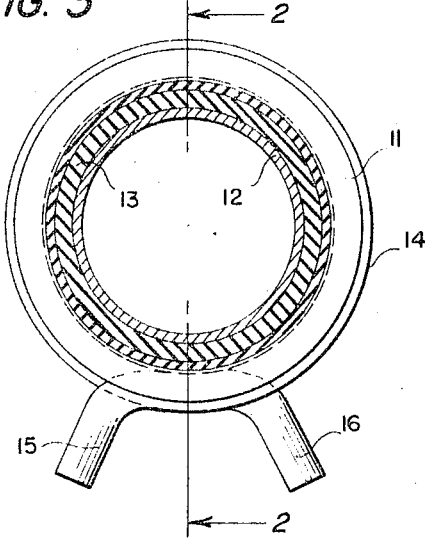
FIGURE 3 is a cross-sectional view taken along the line 3—3 of FIGURE 2.
Figure 4:
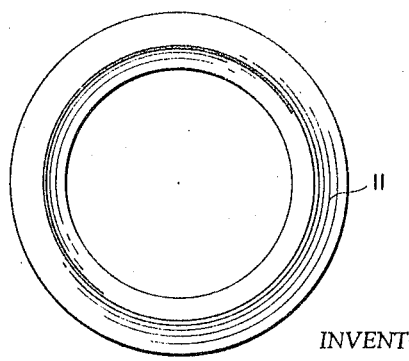
FIGURE 4 is an end elevational view of the corrugated tubing.

The present invention contemplates the use of some form of tube clamp 14 to positively fix the positions of the corrugated tubing 11, the noncorrugated tubing section 12 and the seal-connector 13 with respect to each other. A conventional, self-tightening, spring wire hose clamp 14 having tangs 15 and 16 has been employed to secure the seal-connector 13 in fluid-tight engagement with the tubing section 12 (FIGS. 1 and 3).

Figure 2:
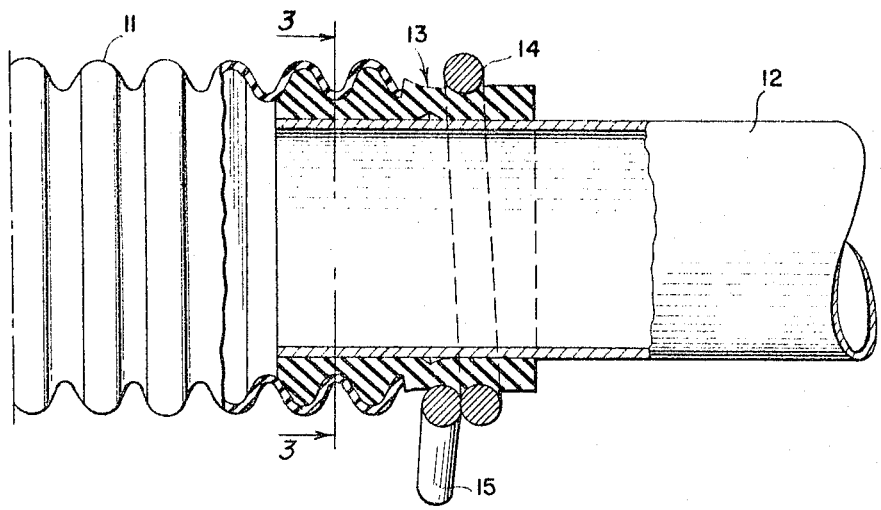
FIGURE 2 is a side elevational view, partly in section, showing the interconnection and engagement between the respective parts of said tube coupling.
Figure 5:
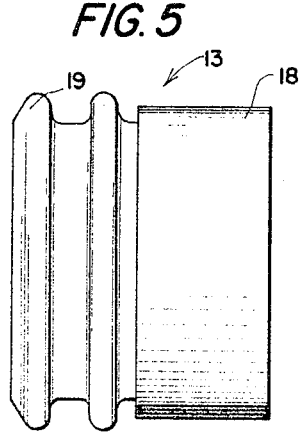
FIGURE 5 is a side elevational view of a specific embodiment of a seal-connector of the present invention.
Figure 6:
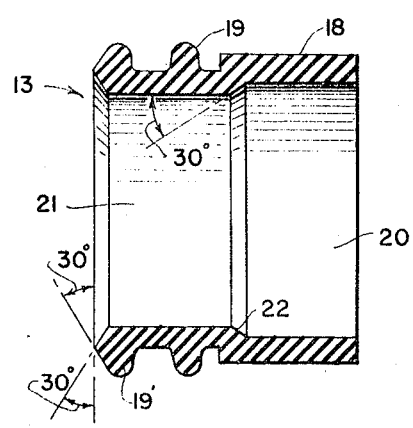
FIGURE 6 is a longitudinal section of said seal-connector.

The seal-connector 13, a specific embodiment of the present invention, is molded of a pliable rubber material having a hardness in the range of about 30–40 durometer. It has smooth, straight portions 21 and 22 for contacting conventional, noncorrugated tubing 12 and a corrugated or undulating rib and groove portion 19 for contacting the corrugated configuration of the plastic tubing 11. The internal surface of the seal-connector 13 has a first noncorrugated tube contacting section 20 of a first predetermined diameter and a second noncorrugated tube contacting section 21 of a diameter smaller than said first diameter. The difference in the diameters of the smooth tube contacting sections 20 and 21 must be sufficient to provide an adequate amount of compression for tightening the seal-connector 13 onto the tube 11 when the tube 12 is urged into the said section 21. This difference might be expressed in terms of linear measurement. The determination of such a measurement is clearly within the ordinary skill of the art. The said sections 20 and 21 are joined by an intermediate ramp 22 that is disposed at an angle of approximately 30° (FIGS. 2, 5 and 6). The importance and function of the ramp 22 will become readily apparent when the operation of the seal-connector 13 is described below.

In operation, a seal-connector 13 is selected having a section 20 with a diameter dimensioned to easily accept the noncorrugated tubing 12. The seal-connector 13 is then collapsed at the rib and groove portion 19 and the said portion 19 is then inserted into the end of the corrugated plastic tubing 11. A sufficient length of the rib and groove portion 19 must be engaged with the corrugated tubing 11 to provide an optimum gripping effect and to prevent leakage between the said portion 19 and said tubing 11. The seal-connector of this specific embodiment has two ribs and grooves in contact with the corrugated tubing 11. It is obvious to one having ordinary skill in the art that the particular length necessary to accomplish the desired results is a function of various parameters, e.g., the type of corrugations, the diameters of the parts being interengaged, the resilience of the parts, etc. When the seal-connector 13 is thus inserted and released, it will spring back to its original shape so that the rib and groove portion 19 can be aligned with the internal corrugations of the tubing 11 as shown in FIGURE 2.

Once the tube contacting surface of the rib and groove portion 19 is fixed in the desired position, the noncorrugated tubing 12 is moved from said first section 20, over the ramp 22 and into engagement with the said second section 21. The movement of tubing 12 as described will cause the said portion 19 to expand, thereby tightening the engagement between said portion 19 and the corrugated tubing 11. In addition, the engagement between the said sections 20 and 21 and the tubing 12 will be tightened due to the resolution of forces within the resilient seal-connector 13. The coupling 10 is positively locked in place and sealed to prevent leakage at the juncture of the corrugated tubing 11 and noncorrugated tubing 12. A clamp 14 of a size effective to secure the seal-connector 13 on the tubing 12 is positioned on the straight portion 18.

A modification (not shown) of the above described specific embodiment comprises a first portion having a rib and groove configuration on the inner surface of the seal-connector and a second noncorrugated tube contacting portion on the outer surface of said seal-connector wherein said second portion includes varying dimensioned diameters. A corrugated tube would then be engaged inside the seal-connector within the bore and a noncorrugated tube would be moved over the outside diameters of said seal-connector.

Figure 7:
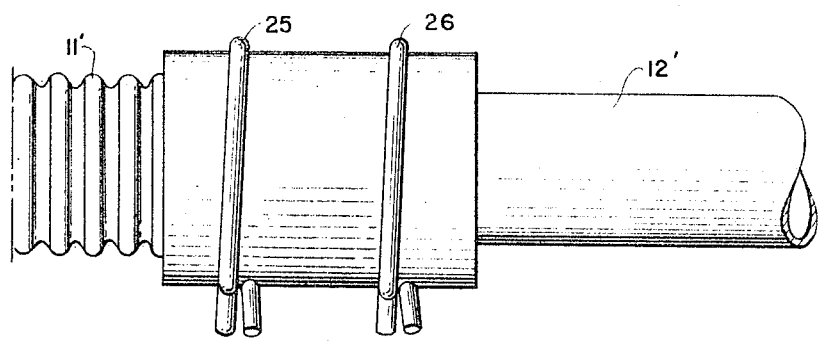
FIGURE 7 is a side elevational view of a proposed modification of the present invention.
Figure 8:
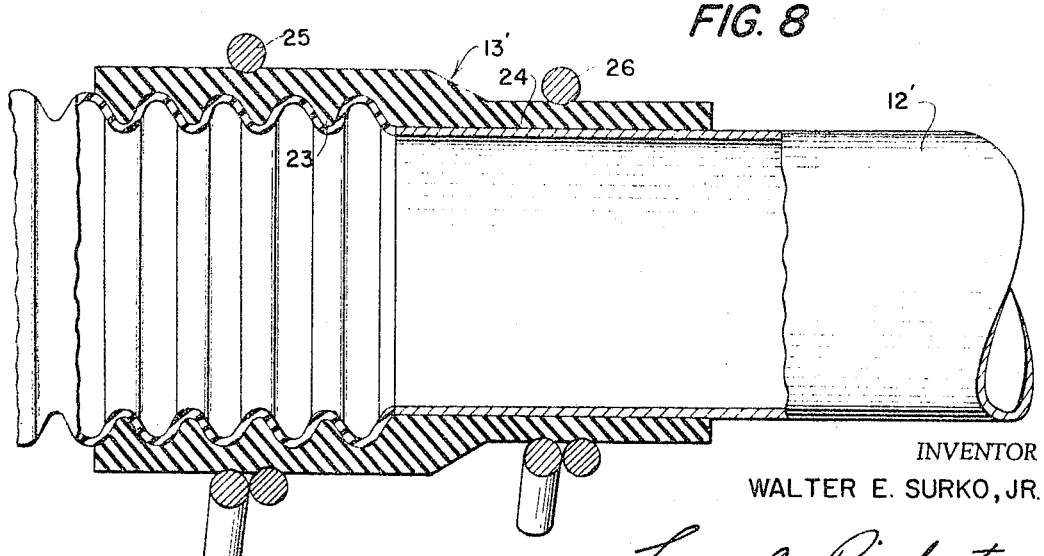
FIGURE 8 is an enlarged, side elevational view, partly in longitudinal section, of the assembly shown in FIGURE 7.

Another modification (FIGS. 7 and 8) shows a seal-connector 13' of the present invention including an inner surface which is divided into two tube contacting sections 23 and 24 having different surface configurations. The second section 24 has a smooth bore having a diameter dimensioned to fit tightly over the outside diameter of the noncorrugated tube section 12'. In operation, a sufficient length of flexible plastic tubing 11' is inserted into section 23 of seal-connection 13'. The tube section 12' is then pushed into the tightly fitted, smooth bore section 24 of seal-connector 13' to thereby cause the resilient material of said seal-connector 13' to be compressed. The resultant state of compression would cause the said material to increase the holding forces acting on the corrugations of the tube section 11'. This particular embodiment contemplates the use of self-tightening clamps 25 and 26 to help secure the seal-connector 13' to each of the tube sections 23 and 24, respectively.

While this invention has been shown with respect to very specific embodiments, it is obvious to those skilled in the art that it is susceptible to various other changes and modifications without departing from the spirit and scope of the claimed invention.

I claim:
1. A tube coupling comprising a flexible tube section having an annular undulating rib and groove configuration, a rigid tube section having a substantially smooth configuration and substantially constant outside diameter, and a resilient connector joining said tube sections;

said resilient connector being tubular and having an outer surface and a central bore extending therethrough;

said outer surface comprising an annular, undulating rib and groove flexible tube contacting portion and a clamp engaging portion;

said central bore inwardly of said clamp engaging portion being of a diameter adapted to conform to the outer diameter of said rigid tube section;

said bore inwardly of said flexible tube contacting portion being of a smaller diameter than said first-mentioned diameter;

whereby when said undulating rib and groove portion of said connector is positioned inside of the open end of said flexible tube and said rigid tube is inserted into engagement with the surfaces of both diameters of said bore, said smaller diameter portion of said connector is expanded outwardly into a state of compression to form a sealing engagement with said flexible tube section, and said clamp engaging portion is in frictional engagement with said rigid tube.

2. A tube coupling as set forth in claim 1, the inner surfaces of said connector as defined by said different diameter bores being connected by a sloping step.

3. A tube coupling as set forth in claim 1, and further including a clamping means engaging said clamp engaging portion to clamp it to said rigid tube.

References Cited
UNITED STATES PATENTS

| | | | |
|---|---|---|---|
| Re. 25,765 | 4/1965 | Ankney. | |
| 1,051,396 | 1/1913 | Fentress | 285—237 |
| 2,366,067 | 12/1944 | Smith | 285—260 |
| 3,043,612 | 7/1962 | Pavlik et al. | 285—236 X |
| 3,167,330 | 1/1965 | Draudt | 285—7 |

FOREIGN PATENTS

| | | |
|---|---|---|
| 908,541 | 9/1945 | France. |
| 914,684 | 2/1963 | Great Britain. |

THOMAS F. CALLAGHAN, Primary Examiner

U.S. Cl. X.R.

285—177, 260, 236, 241